US011662745B2

(12) United States Patent
Liu et al.

(10) Patent No.: US 11,662,745 B2
(45) Date of Patent: May 30, 2023

(54) TIME DETERMINATION OF AN INERTIAL NAVIGATION SYSTEM IN AUTONOMOUS DRIVING SYSTEMS

(71) Applicants: Baidu USA LLC, Sunnyvale, CA (US); Baidu.com Times Technology (Beijing) Co., Ltd., Beijing (CN)

(72) Inventors: Quanwei Liu, Sunnyvale, CA (US); Yan Cui, Sunnyvale, CA (US); Zhuo Yao, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 270 days.

(21) Appl. No.: 16/757,894

(22) PCT Filed: Mar. 26, 2020

(86) PCT No.: PCT/CN2020/081473
§ 371 (c)(1),
(2) Date: Apr. 21, 2020

(87) PCT Pub. No.: WO2021/189373
PCT Pub. Date: Sep. 30, 2021

(65) Prior Publication Data
US 2021/0302998 A1    Sep. 30, 2021

(51) Int. Cl.
*G05D 1/02* (2020.01)
*H04J 3/06* (2006.01)
*G05D 1/00* (2006.01)

(52) U.S. Cl.
CPC ......... *G05D 1/0278* (2013.01); *G05D 1/0088* (2013.01); *G05D 1/0221* (2013.01); *H04J 3/0652* (2013.01)

(58) Field of Classification Search
CPC ... H04J 3/0652; G05D 1/0221; G05D 1/0088; G05D 1/0278
See application file for complete search history.

(56) References Cited

U.S. PATENT DOCUMENTS

| | | | |
|---|---|---|---|
| 10,816,995 B2 * | 10/2020 | Zhang | G05D 1/0278 |
| 2010/0103033 A1 | 4/2010 | Roh | |
| 2016/0349379 A1 * | 12/2016 | Lacaze | G01S 19/215 |
| 2018/0302751 A1 * | 10/2018 | Coutinho | G01S 5/02526 |

(Continued)

FOREIGN PATENT DOCUMENTS

| | | |
|---|---|---|
| CN | 103557865 A | 2/2014 |
| CN | 103675844 A | 3/2014 |

(Continued)

*Primary Examiner* — Yazan A Soofi
(74) *Attorney, Agent, or Firm* — Womble Bond Dickinson (US) LLP

(57) ABSTRACT

In one embodiment, a method for synchronizing sensor data of an autonomous driving vehicle includes determining, by a processing device of an inertial navigation system (INS), that global navigation satellite system (GNSS) data is unavailable and identifying an alternative source of time information. The method further includes retrieving time information from the alternative source and synchronizing sensor data with the time information from the alternative source of time information.

20 Claims, 9 Drawing Sheets

(56) References Cited

U.S. PATENT DOCUMENTS

| | | | |
|---|---|---|---|
| 2019/0049957 A1* | 2/2019 | Healey | A61B 5/024 |
| 2019/0236058 A1* | 8/2019 | Komala | H04L 67/535 |
| 2019/0261161 A1* | 8/2019 | Cardoso | H04W 4/38 |
| 2020/0064836 A1* | 2/2020 | Zhang | G05D 1/0278 |
| 2020/0064859 A1* | 2/2020 | Zhang | G05D 1/0231 |
| 2020/0064861 A1* | 2/2020 | Zhang | G01S 19/13 |
| 2020/0064862 A1* | 2/2020 | Kwan | B60W 50/045 |
| 2020/0116502 A1* | 4/2020 | Xu | G01C 21/26 |
| 2020/0225363 A1* | 7/2020 | Samii | G01S 19/40 |
| 2020/0333470 A1* | 10/2020 | Oh | G05D 1/0278 |

FOREIGN PATENT DOCUMENTS

| | | |
|---|---|---|
| CN | 105259787 A | 1/2016 |
| CN | 109269471 A | 1/2019 |
| CN | 109429518 A | 3/2019 |
| CN | 110426033 A | 11/2019 |

* cited by examiner

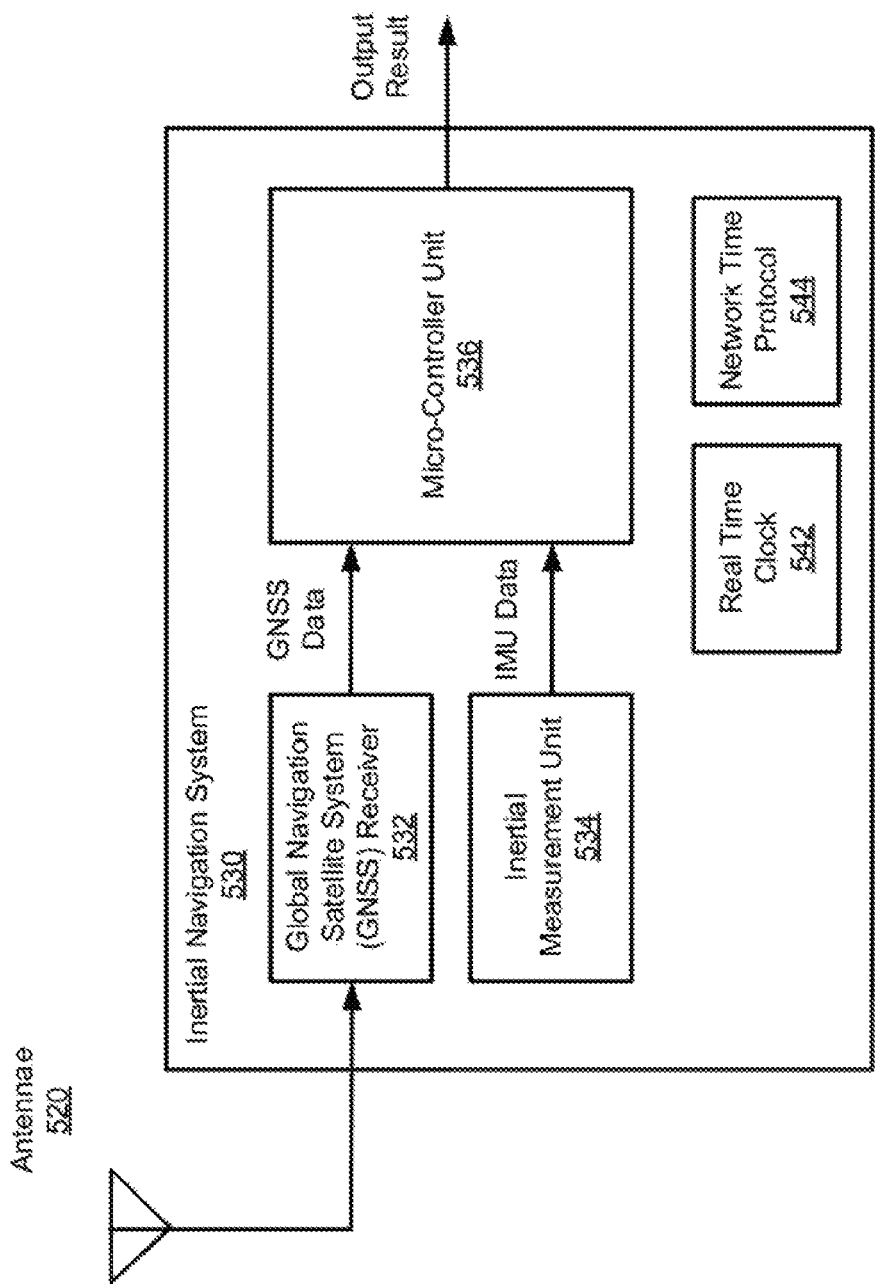

TIME DETERMINATION OF AN INERTIAL NAVIGATION SYSTEM IN AUTONOMOUS DRIVING SYSTEMS

CROSS-REFERENCE TO RELATED APPLICATION

This patent application is a U.S. National Phase Application under 35 U.S.C. § 371 of International Application No. PCT/CN2020/081473, filed Mar. 26, 2020, entitled "TIME DETERMINATION OF AN INERTIAL NAVIGATION SYSTEM IN AUTONOMOUS DRIVING SYSTEMS," which is incorporated by reference herein in its entirety.

TECHNICAL FIELD

Embodiments of the present disclosure relate generally to operating autonomous vehicles. More particularly, embodiments of the disclosure relate to time determination of an inertial navigation system in autonomous driving systems.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Onboard processing systems can provide an approximate location of the vehicle using sensor data such as global navigation satellite system data, inertial measurement data, etc.

SUMMARY

Embodiments of the present disclosure provide a method for operating an autonomous driving vehicle (ADV), an inertial navigation system (INS), and a non-transitory machine-readable medium.

According to a first aspect, some embodiments of the present disclosure provide a method for operating an autonomous driving vehicle (ADV), the method includes: determining, by a processing device of an inertial navigation system (INS), that global navigation satellite system (GNSS) data is unavailable, wherein the INS is coupled to a plurality of sensors mounted on a plurality of locations of the ADV; identifying an alternative source of time information; retrieving time information from the alternative source of time information; synchronizing first sensor data with the time information from the alternative source of time information, wherein the first sensor data is obtained from at least one of the sensors; and transmitting the first sensor data synchronized with the time information to a host system, wherein the host system is configured to perceive a driving environment surrounding the ADV, plan a trajectory based on the driving environment, and control the ADV to navigate the driving environment based on the trajectory.

According to a second aspect, some embodiments of the present disclosure provide an inertial navigation system (INS), the system includes: a sensor interface to be coupled to a plurality of sensors mounted on a plurality of locations of an autonomous driving vehicle (ADV); a host interface to be coupled to a host system operating the ADV; and a processing device coupled to the sensor interface and the host interface, where the processing device is configured to: determine that global navigation satellite system (GNSS) data is unavailable to the INS; identify an alternative source of time information; retrieve time information from the alternative source of time information; synchronize first sensor data with the time information from the alternative source of time information, wherein the first sensor data is obtained from at least one of the sensors; and transmit the first sensor data synchronized with the time information to the host system, wherein the host system is configured to perceive a driving environment surrounding the ADV, plan a trajectory based on the driving environment, and control the ADV to navigate the driving environment based on the trajectory.

According to a third aspect, some embodiments of the present disclosure provide a non-transitory machine-readable medium having instructions stored therein, which when executed by a processor, cause the processor to perform operations of operating an autonomous driving vehicle (ADV), the operations including: determining, by a processing device of an inertial navigation system (INS), that global navigation satellite system (GNSS) data is unavailable, where the INS is coupled to a plurality of sensors mounted on a plurality of locations of the ADV; identifying an alternative source of time information; retrieving time information from the alternative source of time information; synchronizing first sensor data with the time information from the alternative source of time information, wherein the first sensor data is obtained from at least one of the sensors; and transmitting the first sensor data synchronized with the time information to a host system, wherein the host system is configured to perceive a driving environment surrounding the ADV, plan a trajectory based on the driving environment, and control the ADV to navigate the driving environment based on the trajectory.

BRIEF DESCRIPTION OF THE DRAWINGS

Embodiments of the disclosure are illustrated by way of example and not limitation in the figures of the accompanying drawings in which like references indicate similar elements.

FIG. 5B is a block diagram illustrating an example inertial navigation system of an autonomous vehicle according to one embodiment.

DETAILED DESCRIPTION

Figure 1:
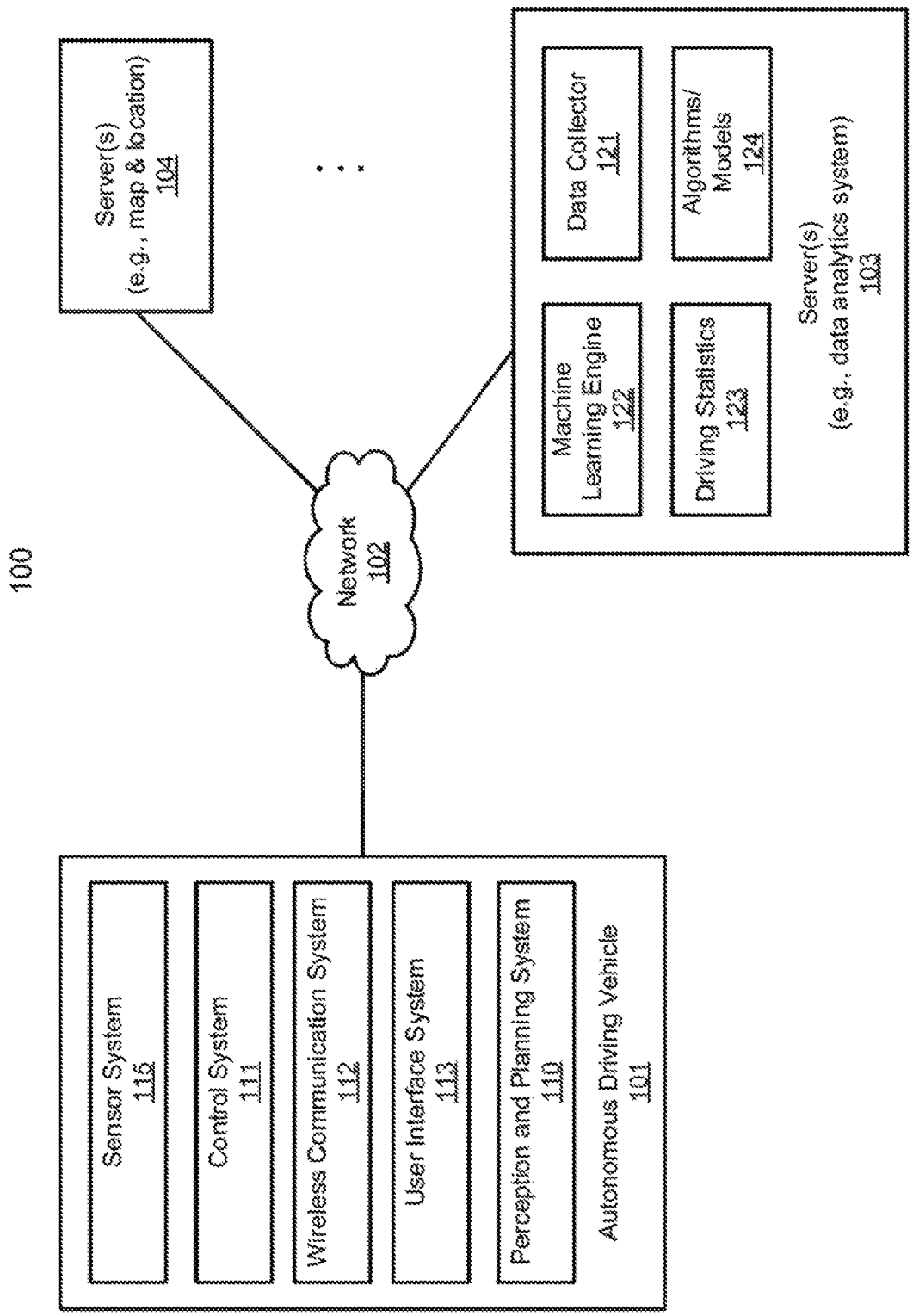
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

To calculate a location of an autonomous vehicle, a sensor unit, such as an inertial navigation system (INS), can include a global navigation satellite system (GNSS) and an inertial measurement unit (IMU). The GNSS may measure position, velocity and heading of the vehicle. An IMU may measure acceleration and gyroscopic orientation of the vehicle. A processing device can combine the GNSS data and IMU data to estimate (e.g., using a Kalman filter) a location of the vehicle. In conventional systems, a timestamp from the GNSS data is used to synchronize the IMU data with the GNSS data. For example, the IMU data received at approximately the same time as the GNSS data is timestamped with the timestamp from the GNSS data. The timestamp of the IMU data is then used to synchronize (i.e., timestamp) additional sensor data that is used for performing localization (i.e., determination of a location of the ADV). However, if GNSS data becomes unavailable, the IMU data cannot be synchronized with a GNSS timestamp which means that additional sensor data cannot be synchronized either. This results in the inability to perform localization due to a lack of sensor data synchronization.

To address the issues described above, embodiments of the present disclosure provide for an alternative source of time information for determination of time in an INS. An INS may include an alternative source of time information, such as a real time clock (RTC) or a network time protocol (NTP), to timestamp sensor data with a current time even if GNSS data is unavailable. For example, if GNSS time data is unavailable, processing logic of the INS may retrieve time information from the alternative source of time information to timestamp IMU data. The IMU data and the associated timestamp may then be forwarded to a localization module to synchronize additional sensor data and to perform localization of the ADV.

According to some embodiments, a method includes determining, by a processing device of an inertial navigation system (INS), that global navigation satellite system (GNSS) data is unavailable and identifying, an alternative source of time information. The method further includes retrieving time information from the alternative source of time information and synchronizing sensor data with the time information from the alternative source. The sensor data with synchronized time is utilized to perceive a driving environment surrounding the ADV, plan a path to navigate the driving environment, and autonomously control the ADV according to the path.

According to some embodiments, a system includes a memory and a processing device coupled to the memory. The processing device may determine that global navigation satellite system (GNSS) data is unavailable to the inertial navigation system, identify, an alternative source of time information and retrieve time information from the alternative source. The processing device may then synchronize sensor data with the time information from the alternative source.

According to some embodiments, a non-transitory computer-readable storage medium includes instructions executable by a processing device. When executed, the instructions may cause the processing device to determine that global navigation satellite system (GNSS) data is unavailable to the inertial navigation system, identify, an alternative source of time information, and retrieve time information from the alternative source of time information. The processing device may further synchronize sensor data with the time information from the alternative source.

FIG. 1 is a block diagram illustrating an autonomous vehicle network configuration according to one embodiment of the disclosure. Referring to FIG. 1, network configuration 100 includes autonomous driving vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to operate in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
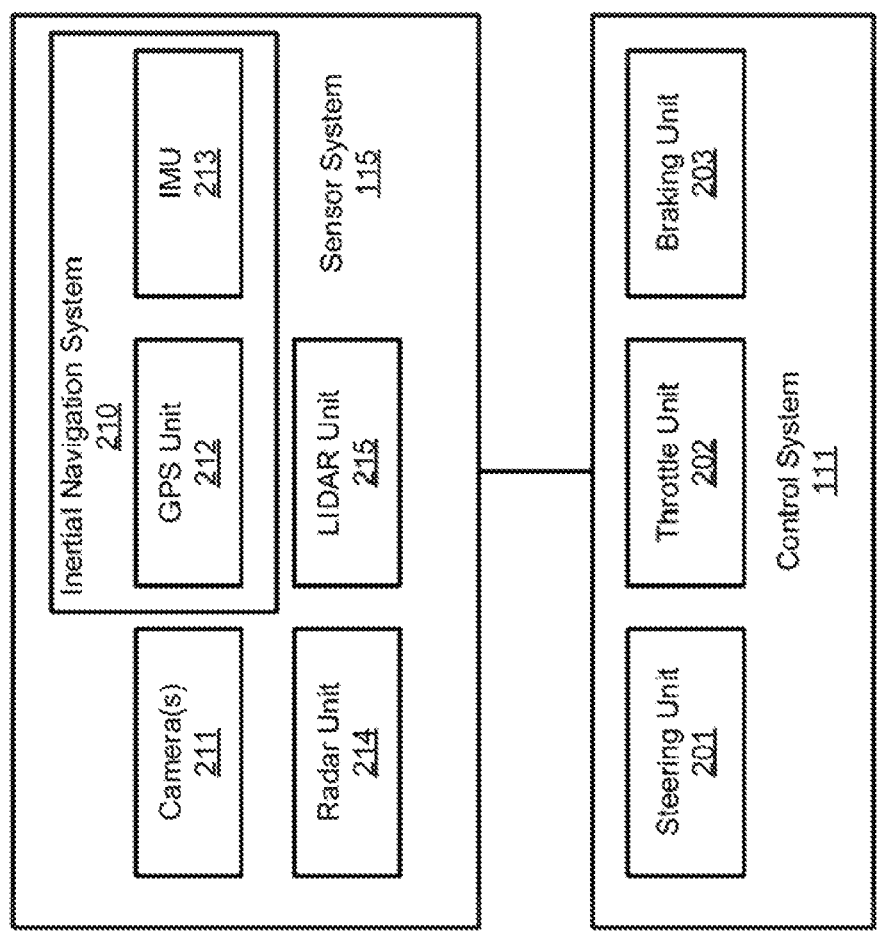
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS unit 212 and IMU 213 may be included together in an inertial navigation system (INS) 210. The INS 210 may combine data from the GPS unit 212 and the IMU 213 to calculate a precise location of the autonomous vehicle. GPS unit 212 (also referred to herein as a GNSS) may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include algorithms to synchronizing timing information from a variety of time sources (e.g., GNSS, RTL, and/or NTP sources). Algorithms 124 can then be uploaded on ADVs to be utilized during autonomous driving in real-time.

Figure 3:
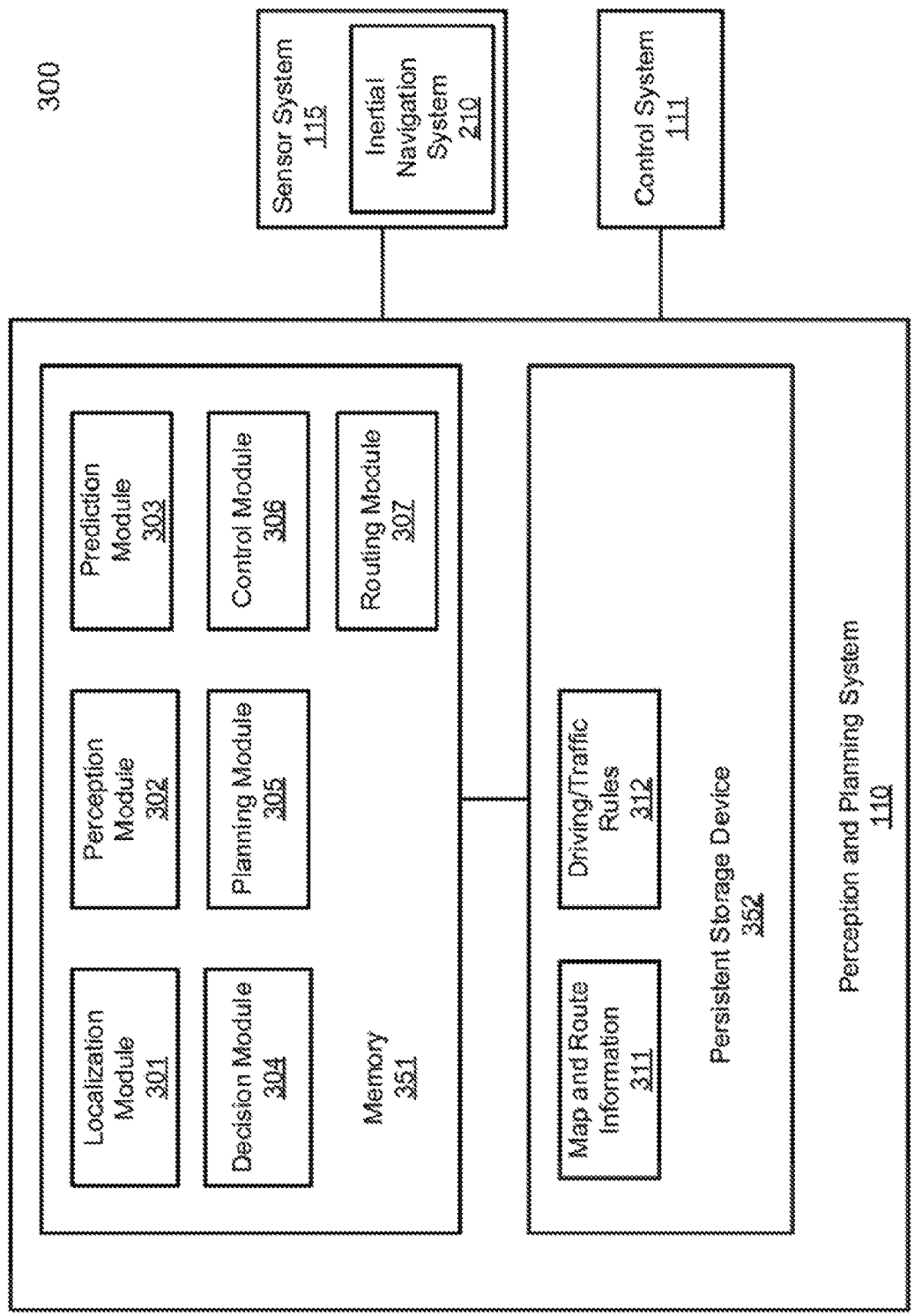
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300, also referred to as an autonomous driving system (ADS), may be implemented as a part of autonomous vehicle 101 of FIG. 1 including, but not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging INS 210 and sensor system 115) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensor data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly, or closely, follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic conditions predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system, an inertial navigation system, and one or more maps so as to determine the driving path for the autonomous vehicle.

Figure 4:
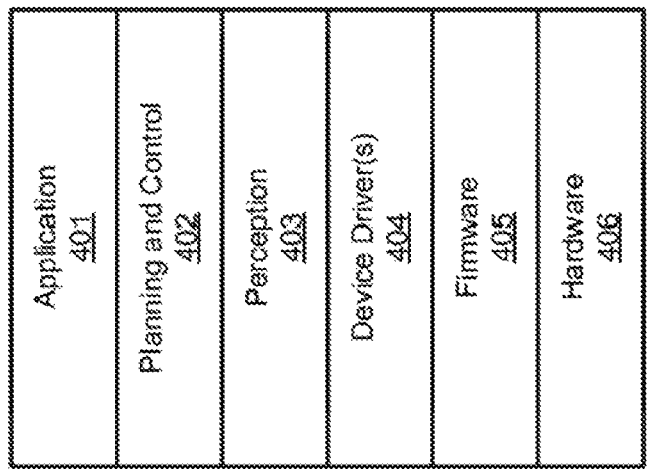
FIG. 4 is a block diagram illustrating an example system architecture for autonomous driving according to one embodiment.

FIG. 4 is a block diagram illustrating system architecture for autonomous driving according to one embodiment. System architecture 400 may represent system architecture of an autonomous driving system as shown in FIG. 3. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
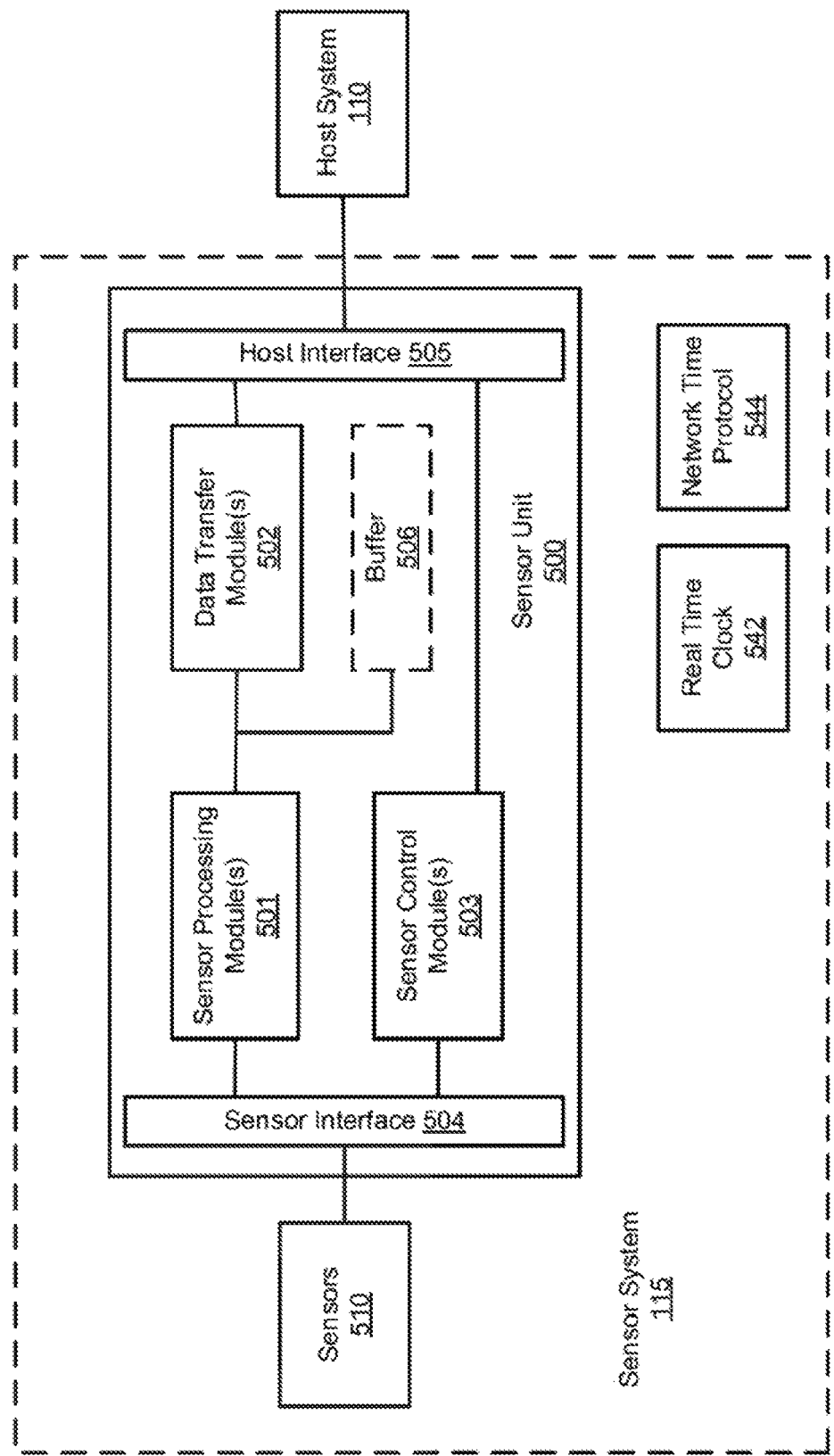
FIG. 5A is a block diagram illustrating an example of a sensor system of an autonomous vehicle according to one embodiment.

FIG. 5A is a block diagram illustrating an example of a sensor system according to one embodiment of the invention. Referring to FIG. 5A, sensor system 115 includes a number of sensors 510 and a sensor unit 500 coupled to host system 110. Host system 110 represents a planning and control system as described above, which may include at least some of the modules as shown in FIG. 3. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

In one embodiment, sensors 510 may be a GPS unit and an IMU. The GPS unit and IMU may be coupled together with a sensor unit 500 on a single FPGA, or ASIC, referred to as an inertial measurement system (INS), as depicted in FIG. 5B. The sensor processing module 501 may include logic to receive data from the GPS unit and the IMU and combine the data (e.g., using a Kalman filter) to estimate a location of the automated vehicle. The sensor processing module 501 may further include, as described below with respect to FIG. 5, logic to retrieve time information from an RTC, NTP, or other source of time information.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel may include a specific sensor processing module and a specific data transfer module that have been configured or programmed to handle the corresponding sensor data and protocol.

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth the connection between the data transfer module and the host system 110. The accumulated sensor data is then transferred to the host system 110 in a batch that utilizes the maximum bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

In one embodiment, the sensor system 115 may include one or both of a real time clock 542 and a network time protocol 544. Note that components 542 and/or 544 may be implemented as a part of sensor unit 500. The real time clock 542 may be hardware, such as an integrated circuit, software, or a combination thereof that is local to the sensor system to provide current time data. The RTC 542 may be powered by power source other than the power source of the sensors 510 or sensor unit 500 (e.g., a battery). The RTC 542 may use a crystal oscillator or the power line frequency to keep track of a current time. The network time protocol 544 may be used to retrieve current time information from the internet. The NTP 544 may request and receive, from an NTP server, a timestamp consisting of 64 bits, 128 bits or any other number of bits indicating a current time. The received timestamp may be adjusted by the NTP 544 to account for a delay in transmission from an NTP server.

FIG. 5B depicts an inertial navigation system (INS) 530 which may be included within the sensor system 115 of FIG. 5A, according to one embodiment. The INS 530 includes, but is not limited to, a GNSS receiver 532 (otherwise referred to as GPS unit), an inertial measurement unit (IMU) 534, and micro-controller unit (MCU) 536. GNSS receiver 532 may receive and process GNSS measurements from antennae 520, which may be external to the INS 530 (e.g., on the roof of the vehicle). GNSS receiver 532 may then forward GNSS data to the MCU 536. GNSS data may include a position, velocity, and heading of the vehicle, along with timestamp indicating when the measurement was taken. In one embodiment, IMU 534 may measure acceleration and orientation of the automated vehicle and send these measurements to the MCU 536 to be combined with the GNSS data (e.g., via a Kalman filter). The MCU 536 may timestamp the IMU data with the timestamp of the GNSS data to synchronize the data that is measured at approximately the same time. The MCU 536 may forward an output result of the Kalman filter location estimate along with the IMU data that is timestamped with the GNSS data timestamp to a localization module of a perception and planning system for location calculation. In one embodiment, the IMU data timestamp may be used by the localization module, or any other module of the perception and planning system, to synchronize data received from other sensors (e.g., cameras, LiDAR unit, etc.). The localization module may then use the synchronized sensor data to perform a localization calculation. In other embodiments, other modules of the perception and planning system may perform any number of operations using the synchronized sensor data.

However, at times GNSS data may become unavailable for various reasons (e.g., the vehicle is in a tunnel and is not receiving GNSS data). In such a case, the perception and planning system of the ADV may be unable to perform synchronization of sensor data which may result in the loss of localization and other capabilities. In one embodiment, the INS 530 further includes a real time clock (RTC) 542 and/or logic to perform a network time protocol 544 request. When the MCU 536 determines that GNSS data is unavailable, it may retrieve time information from the RTC 542 or the NTP 544 to timestamp the IMU data. The timestamp of the IMU data may then be used by the perception and planning system to synchronize other sensor data. In one embodiment, the real time clock (RTC) 542 may be hardware, such as an integrated circuit, software, or a combination thereof that is local to the sensor system to provide current time data. The RTC 542 may be powered by power source other than the power source of the sensors 510 or sensor unit 500 (e.g., a battery). The RTC 542 may use a crystal oscillator or the power line frequency to keep track of a current time. In one embodiment, the network time protocol 544 may be used to retrieve current time information from the internet. The NTP 544 may request and receive, from an NTP server, a timestamp consisting of 64 bits, 128 bits or any other number of bits indicating a current time. In one embodiment, the received timestamp may be adjusted by the NTP 544 to account for a delay in transmission from an NTP server. Thus, the inclusion of the RTC 542 and/or the NTP 544 may enable localization capabilities even when GNSS time data is unavailable.

Figure 5C:
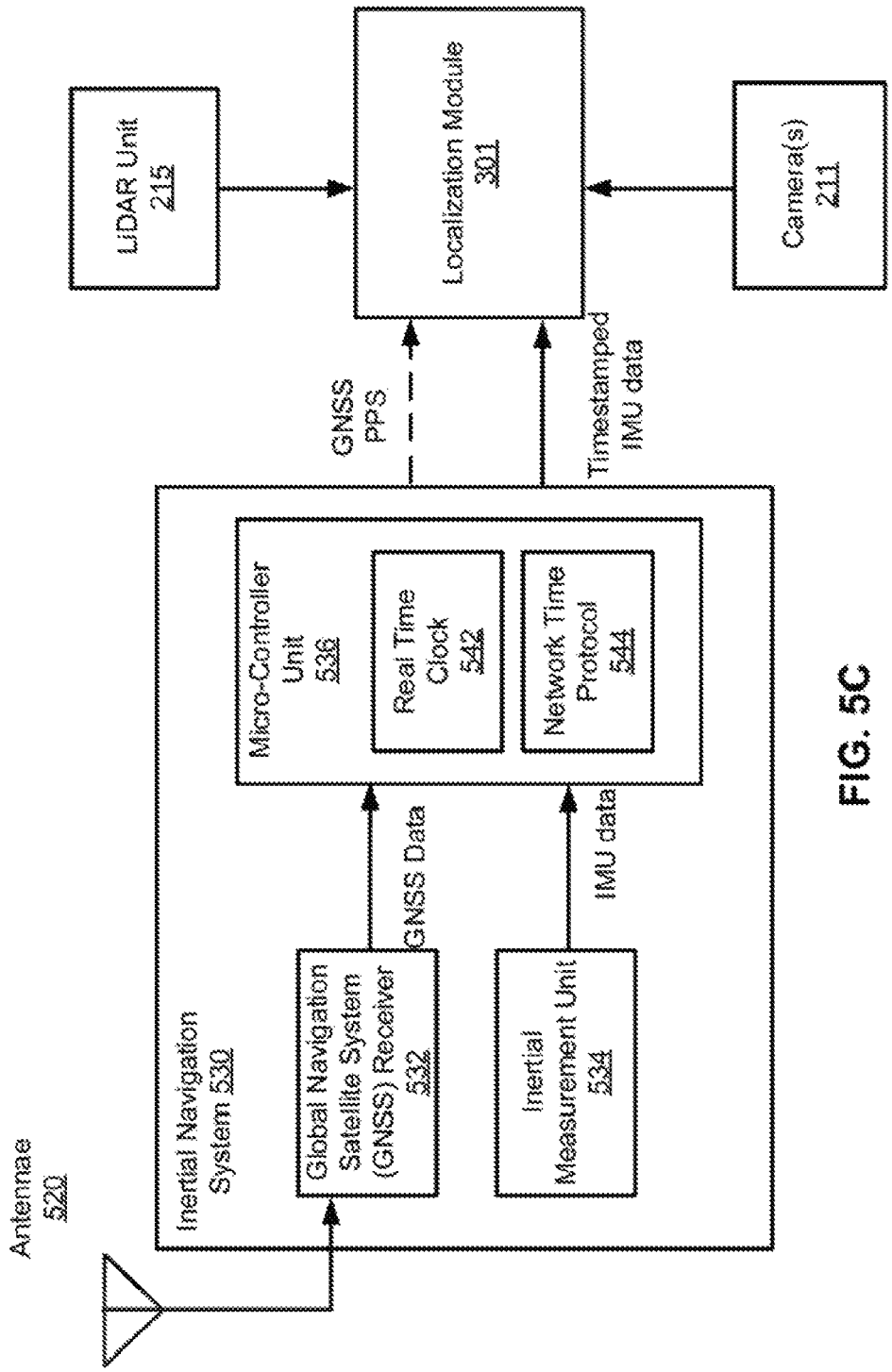
FIG. 5C is a block diagram illustrating an example inertial navigation system within a sensor system according to one embodiment.

FIG. 5C depicts a sensor system according to one embodiment. The sensor system may include an INS 530, a localization module 301, and sensors such as a LiDAR unit 215 and cameras 211. The INS 530 may include a GNSS receiver 532, IMU 534 and MCU 536, similar to FIG. 5B. Additionally, in one embodiment, MCU 536 may include an RTC 542 and a NTP 544. In one embodiment, if the MCU 536 determines that GNSS data is unavailable for a threshold period of time, then the MCU 536 may timestamp IMU data received form the IMU with time information from one of the RTC 542 or the NTP 544. In one embodiment, the MCU 536 may first attempt to timestamp the IMU data using the time information from the RTC 542. If the RTC data is unavailable, the MCU 536 may then timestamp the IMU data with time information using the NTP 544. In another embodiment, the MCU 536 first attempts to timestamp the IMU data using the NTP 544. If the NTP 544 time information is unavailable, the MCU 536 uses the RTC 542 to timestamp the IMU data.

In one embodiment, the MCU 536 may forward the timestamped IMU data to the localization module 301. The localization module 301 may be the same or similar to the localization module 301 described with respect to FIG. 3. Localization module 301 may be included in a planning and perception module (e.g., planning and perception module 110). The localization module 301 may also receive sensor data from other sensor units, such as LiDAR unit 215 and camera(s) 211. The localization module may then synchronize all of the received sensor data with the IMU data by timestamping each of the sensor data received at approximately the same time with the timestamp of the IMU data (i.e., the RTC 542 or NTP 544 time information). The localization module 301 may then perform a localization operation using the synchronized sensor data to determine a location of the ADV.

In one embodiment, in addition to forwarding the timestamped IMU data, the MCU 536 may also transmit a hardware generated pulse, or signal, once every second (referred to as a pulse per second or PPS). The localization module 301 may use the PPS to calibrate the timestamp of the IMU data to account for delay, drift, or jitter of the timestamp received from the RTC 542 and/or NTP 544. The RTC 542 and/or NTP 544 time information may be generated by software and may be subject to error. The localization module 301 may use the hardware generated PPS to calibrate the timestamp of the IMU data and reduce errors resulting from the software generated time information.

Figure 6:
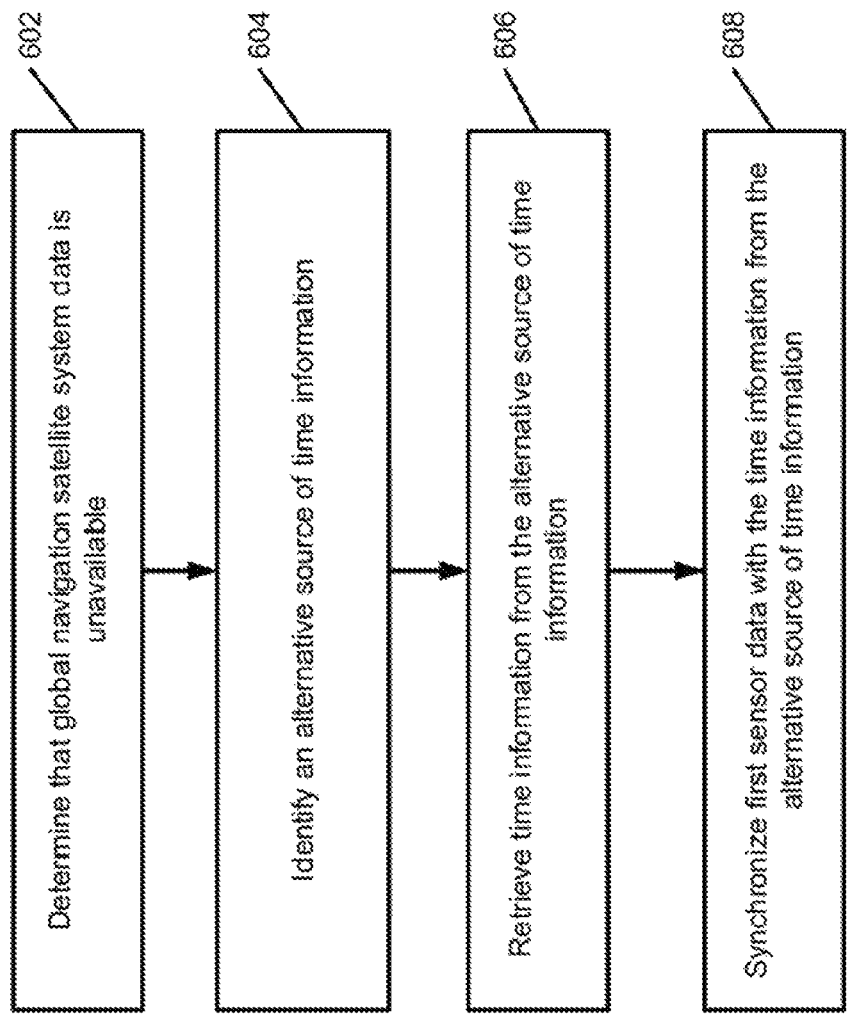
FIG. 6 is a flow diagram illustrating an example method for to time determination of an inertial navigation system in autonomous driving systems according to one embodiment.

FIG. 6 is a flow diagram illustrating a process of adjusting for GNSS latency in an inertial navigation system of an autonomous vehicle according to one embodiment. Process 600 may be performed by hardware, software, or a combination thereof. Process 600 may be performed by processing logic at an MCU of an INS. At operation 602, processing logic determines that GNSS+ data is unavailable. The processing logic may determine that the GNSS data is unavailable if GNSS data has not been received for a threshold period of time. In another embodiment, the processing logic may determine that the GNSS data is unavailable if GNSS data is not received as expected (e.g., GNSS data expected once every second but has not been received for five seconds). The processing logic may determine that the GNSS data is unavailable using any other method to identify missing data, expected data, etc.

At operation 604, processing logic identifies an alternative source of time information. In one embodiment, the processing logic may query one or more alternative sources of time information and select one or more of those sources to obtain time information from. For example, the processing logic may identify that a network is available and that a network time protocol may be used to obtain current time information. In another example, the processing logic may identify that a real time clock is included locally in an inertial navigation system from which current time information may be obtained.

At operation 606, processing logic retrieves time information from the alternative source of time information. In one embodiment, once the processing logic has identified the alternative source of time information, the processing logic may request the time information. For example, the NTP may be executed to retrieve the current time information from the internet, or the processing logic may request the time information from the real time clock. In one example, the processing logic continuously received the current time information from the alternative sources when the GNSS data is unavailable. In another example, the processing logic receives the time information from the alternative sources even when GNSS time data is available. In this case, the time information from the alternative sources may be calibrated using the GNSS time data.

At operation 608, processing logic synchronizes sensor data with the time information from the alternative source of time information. In one embodiment, the processing logic may sync sensor data received from the IMU of the INS with the time information from the alternative source. For example, the processing logic may receive the IMU data and timestamp the IMU data with the time information (e.g., associate the IMU data with a current time). Therefore, the IMU data may be timestamped with the time information from the alternative source of time information even if GNSS time data is unavailable. The processing logic may additionally forward the timestamped IMU data to a planning and perception module where data from other sensors may be synced with the IMU data timestamp. Thus, the time information from the alternative source may be further used to sync all sensor data received by the planning and perception module.

Figure 7:
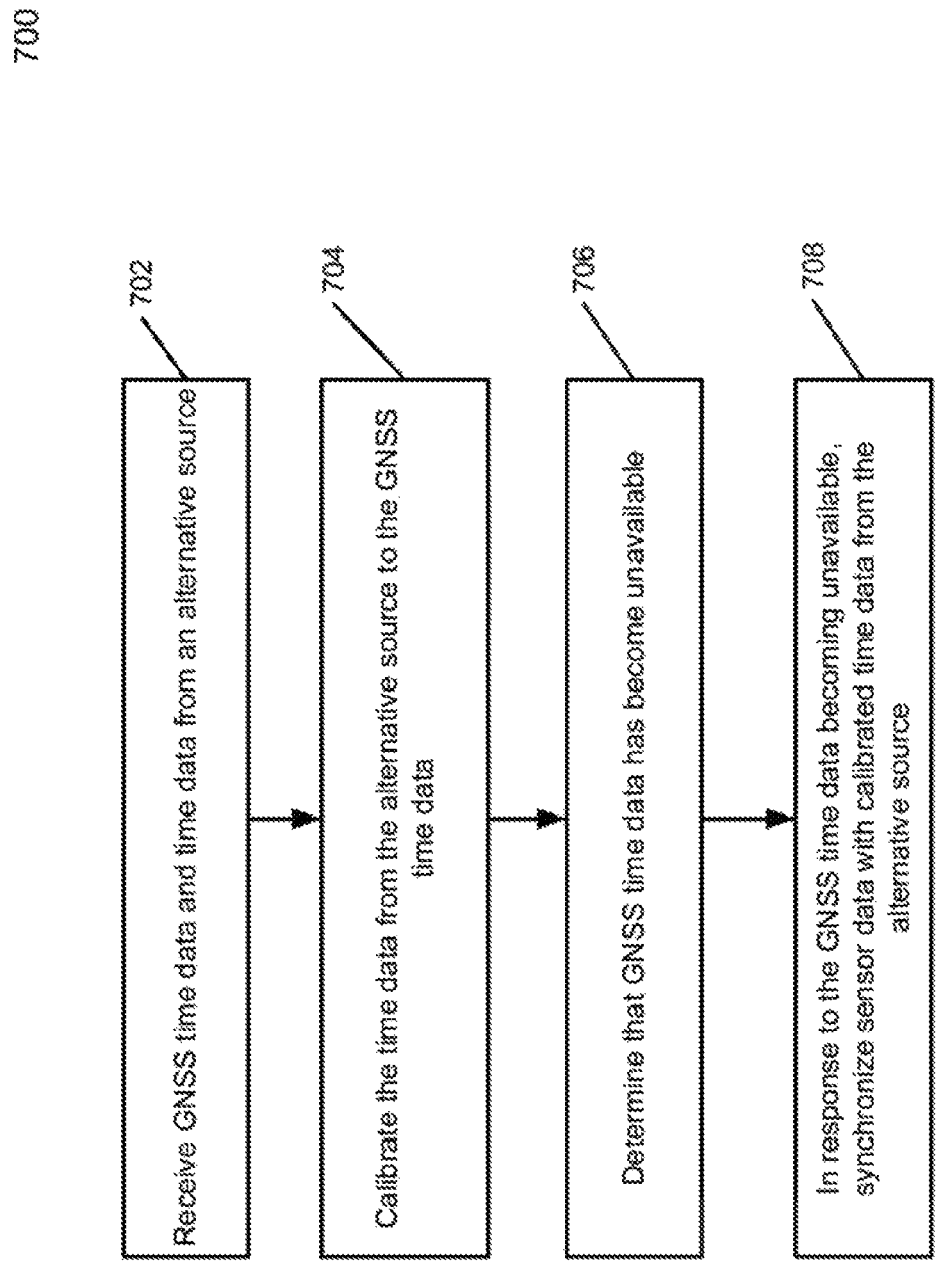
FIG. 7 is a flow diagram illustrating another example method for to time determination of an inertial navigation system in autonomous driving systems according to one embodiment.

FIG. 7 is a flow diagram illustrating a process of adjusting for GNSS latency in an INS according to another embodiment. Process 600 may be performed by hardware, software, or a combination thereof. Process 700 may be performed by processing logic of an MCU of an INS. At operation 702, the processing logic receives GNSS time data and time data from an alternative source. The GNSS time data may be received by an antenna of an ADV and processed at a GNSS receiver of an INS. The processing logic may then receive the GNSS data from the GNSS receiver. Additionally, the processing logic may receive time information from an alternative source of time information, such as an RTC or NTP.

At operation 704, the processing logic calibrates the time data from the alternative source using the GNSS time data. The alternative source of time information may be less accurate than the GNSS time data. Therefore, the processing logic may adjust the time information to correspond more closely to the GNSS time data. For example, the alternative source may provide time information that is consistently 5 ms slower than the GNSS time data. In one embodiment, the processing logic may then calibrate the time information from the alternative source by 5 ms each time the time information is received. In this way the processing logic may make the time information from the alternative source more accurately reflect a current time.

At operation 706, the processing logic determines that GNSS time data has become unavailable. In one embodiment, the processing logic may determine that the GNSS data is unavailable if GNSS data has not been received for a threshold period of time. In another embodiment, the processing logic may determine that the GNSS data is unavailable if GNSS data is not received as expected (e.g., GNSS data expected once every second but has not been received for five seconds). The processing logic may also determine that the GNSS data is unavailable using any other method to identify missing data, expected data, etc.

At operation 708, in response to determining that the GNSS time data becoming unavailable, the processing logic synchronizes sensor data with calibrated time data from the alternative source. In one embodiment, the processing logic may synchronize data received from an IMU of the INS by timestamping the IMU data with the adjusted time data from the alternative source. In one embodiment, the processing logic may determine that there is a difference between the previously available GNSS time data and the time data from the alternative source. In such a case, the processing logic may incrementally, over a period of time, adjust from the GNSS time data to the alternative source time data. For example, the timestamp may be adjusted from GNSS time data to the time data from the alternative source over a period of 1 second, one minute, five minutes, or any other time interval to provide a smooth transition. Adjusting the time stamp incrementally over time may prevent errors from occurring due to a large jump in the time used for synchronization.

After timestamping the IMU data, the processing logic may forward the timestamped IMU data to a perception and planning system where other sensor data may be synced with the timestamp of the IMU data. A localization module of the planning and perception system may then calculate a current location of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for operating an autonomous driving vehicle (ADV), the method comprising:
   determining, by a processing device of an inertial navigation system (INS), that global navigation satellite system (GNSS) data is unavailable, wherein the INS is coupled to a plurality of sensors mounted on a plurality of locations of the ADV;
   identifying an alternative source of time information, wherein the alternative source of time information comprises a network time protocol (NTP);
   retrieving time information from the alternative source of time information;
   synchronizing first sensor data with the time information from the alternative source of time information, wherein the first sensor data is obtained from an inertial measurement unit (IMU);

transmitting the first sensor data synchronized with the time information to a host system, wherein the host system is configured to perceive a driving environment surrounding the ADV, plan a trajectory based on the driving environment, and control the ADV to navigate the driving environment based on the trajectory; and synchronizing, with a localization module of the host system, sensor data from a plurality of other sensors with the first sensor data and the time information.

2. The method of claim 1, wherein determining that GNSS data is unavailable comprises determining that GNSS data has not been received for a threshold amount of time.

3. The method of claim 1, further comprising forwarding the first sensor data and the time information from the alternative source to the localization module, wherein the localization module utilizes the first sensor data and the time information to synchronize second sensor data.

4. The method of claim 1, wherein the time information retrieved from the alternative source of time information is adjusted to account for a delay in transmission from an NTP server.

5. The method of claim 1, further comprising in response to determining that the GNSS data is available again, incrementally adjusting the time information from the alternative source to a time from the GNSS data.

6. The method of claim 1, further comprising:
determining that GNSS data is available; and
calibrating the time information from the alternative source using the GNSS data.

7. An inertial navigation system (INS), comprising:
a sensor interface to be coupled to a plurality of sensors mounted on a plurality of locations of an autonomous driving vehicle (ADV);
a host interface to be coupled to a host system operating the ADV; and
a processing device coupled to the sensor interface and the host interface, wherein the processing device is configured to:
determine that global navigation satellite system (GNSS) data is unavailable to the INS;
identify an alternative source of time information, wherein the alternative source of time information comprises a network time protocol (NTP);
retrieve time information from the alternative source of time information;
synchronize first sensor data with the time information from the alternative source of time information, wherein the first sensor data is obtained from an inertial measurement unit (IMU);
transmit the first sensor data synchronized with the time information to the host system, wherein the host system is configured to perceive a driving environment surrounding the ADV, plan a trajectory based on the driving environment, and control the ADV to navigate the driving environment based on the trajectory; and
synchronizing, with a localization module of the host system, sensor data from a plurality of other sensors with the first sensor data and the time information.

8. The system of claim 7, wherein to determine that GNSS data is unavailable the processing device is to:
determine that GNSS data has not been received for a threshold amount of time.

9. The system of claim 7, wherein the processing device is further to:
forward the first sensor data and the time information for the alternative source to the localization module, wherein the localization module utilizes the first sensor data and the time information to synchronize second sensor data.

10. The system of claim 7, wherein the time information retrieved from the alternative source of time information is adjusted to account for a delay in transmission from an NTP server.

11. The system of claim 7, wherein the processing device is further to:
in response to determining that the GNSS data is available again, incrementally adjust the time information from the alternative source to the GNSS data.

12. The system of claim 7, wherein the processing device is further to:
determine that GNSS data is available; and
calibrate the time information from the alternative source using the GNSS data.

13. A non-transitory machine-readable medium having instructions stored therein, which when executed by a processor, cause the processor to perform operations of operating an autonomous driving vehicle (ADV), the operations comprising:
determining, by a processing device of an inertial navigation system (INS), that global navigation satellite system (GNSS) data is unavailable, wherein the INS is coupled to a plurality of sensors mounted on a plurality of locations of the ADV;
identifying an alternative source of time information, wherein the alternative source of time information comprises a network time protocol;
retrieving time information from the alternative source of time information;
synchronizing first sensor data with the time information from the alternative source of time information, wherein the first sensor data is obtained from an inertial measurement unit (IMU);
transmitting the first sensor data synchronized with the time information to a host system, wherein the host system is configured to perceive a driving environment surrounding the ADV, plan a trajectory based on the driving environment, and control the ADV to navigate the driving environment based on the trajectory; and
synchronizing, with a localization module of the host system, sensor data from a plurality of other sensors with the first sensor data and the time information.

14. The machine-readable medium of claim 13, wherein determining that GNSS data is unavailable comprises:
determine that GNSS data has not been received for a threshold amount of time.

15. The machine-readable medium of claim 13, wherein the operations further comprise forwarding the first sensor data and the time information for the alternative source to the localization module, wherein the localization module utilizes the first sensor data and the time information to synchronize second sensor data.

16. The machine-readable medium of claim 13, wherein the time information retrieved from the alternative source of time information is adjusted to account for a delay in transmission from an NTP.

17. The machine-readable medium of claim 13, wherein the operations further comprise in response to determining that the GNSS data is available again, incrementally adjusting the time information from the alternative source to the GNSS data.

18. The machine-readable medium of claim 13, wherein the operations further comprise:
determine that GNSS data is available; and calibrate the time information from the alternative source using the GNSS data.

19. The method of claim 1, further comprising utilizing the sensor data from the plurality of other sensors synchronized with the first sensor data to perform localization of the ADV.

20. The system of claim 7, wherein the localization module is further to: utilize the sensor data from the plurality of other sensors synchronized with the first sensor data to perform localization of the ADV.

\* \* \* \* \*